United States Patent
Sato et al.

(10) Patent No.: US 11,416,707 B2
(45) Date of Patent: Aug. 16, 2022

(54) INFORMATION PROCESSING METHOD, INFORMATION PROCESSING SYSTEM, AND INFORMATION PROCESSING APPARATUS

(71) Applicant: Panasonic Intellectual Property Corporation of America, Torrance, CA (US)

(72) Inventors: Satoshi Sato, Kyoto (JP); Yasunori Ishii, Osaka (JP); Ryota Fujimura, Kanagawa (JP); Pongsak Lasang, Singapore (SG); Changxin Zhou, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 78 days.

(21) Appl. No.: 17/108,492

(22) Filed: Dec. 1, 2020

(65) Prior Publication Data
US 2021/0174143 A1 Jun. 10, 2021

Related U.S. Application Data

(60) Provisional application No. 62/943,494, filed on Dec. 4, 2019.

(30) Foreign Application Priority Data

Jun. 24, 2020 (JP) .............................. JP2020-109061

(51) Int. Cl.
*G06K 9/62* (2022.01)
*G06V 10/40* (2022.01)

(52) U.S. Cl.
CPC ........... *G06K 9/6256* (2013.01); *G06V 10/40* (2022.01)

(58) Field of Classification Search
CPC .... G06K 9/6256; G06V 10/40; G06V 10/147; G06V 10/454; G06V 10/82; G06V 20/52
(Continued)

(56) References Cited

U.S. PATENT DOCUMENTS

| 11,132,427 B2 * | 9/2021 | Fong ...................... G06V 20/80 |
| 2018/0089537 A1 * | 3/2018 | Tsunoda ............... G06K 9/6262 |

(Continued)

FOREIGN PATENT DOCUMENTS

JP 2018-163554 10/2018

OTHER PUBLICATIONS

Xingyi Zhou, et al., "Objects as Points", arXiv:1904.07850v2 [cs.CV], Apr. 2019.
(Continued)

*Primary Examiner* — Neil R McLean
(74) *Attorney, Agent, or Firm* — Wenderoth, Lind & Ponack, L.L.P.

(57) ABSTRACT

An information processing method is executed by a computer, and includes: obtaining a first image generated by a multi-pinhole camera; extracting at least one point spread function (PSF) in each of a plurality of regions in the first image; obtaining a second image different from the first image, and reference data used in machine learning for the second image; generating a third image, by convolving each of a plurality of regions in the second image with at least one PSF extracted in a corresponding region of the plurality of regions in the first image; and outputting a pair of the reference data and the third image.

9 Claims, 8 Drawing Sheets

(58) Field of Classification Search
USPC .......................................................... 382/155
See application file for complete search history.

(56) References Cited

U.S. PATENT DOCUMENTS

2018/0150725 A1* 5/2018 Tate ..................... H04N 5/2353
2018/0276500 A1* 9/2018 Yamada ............... G06K 9/6256

OTHER PUBLICATIONS

Shifeng Zhang, et al., "Single-Shot Refinement Neural Network for Object Detection", CVPR, 2018.
Joseph Redmon, et al., "YOLOv3: An Incremental Improvement", arXiv:1804.02767v1 [cs.CV], Apr. 2018.
Sen Cao, et al., "Detecting the Objects on the Road Using Modular Lightweight Network", arXiv: 1811.06641 [cs.CV], 2018.

* cited by examiner

FIG. 8

| Method | Image Type | AP (%) of different classes ||||| mAP(%) | FPS |
|---|---|---|---|---|---|---|---|---|
| | | eating | lying | sitting | standing | vacuuming | | |
| CenterNet-Res18 | Normal | 79.63 | 72.03 | 85.42 | 82.40 | 83.53 | 80.60 | 70 |
| | Multi-pinhole | 73.59 | 63.73 | 71.71 | 80.11 | 83.17 | 74.46 | |
| CenterNet-DLA34 | Normal | 83.20 | 75.60 | 82.24 | 88.81 | 85.65 | 83.10 | 33 |
| | Multi-pinhole | 78.10 | 71.22 | 79.59 | 82.57 | 84.11 | 79.12 | |
| RefineDet | Normal | 84.03 | 76.83 | 78.64 | 87.20 | 83.19 | 81.98 | 25 |
| | Multi-pinhole | 79.88 | 67.91 | 76.48 | 85.23 | 79.84 | 77.87 | |
| YOLOv3-tiny | Normal | 63.36 | 41.26 | 64.81 | 66.93 | 56.09 | 58.49 | 200 |
| | Multi-pinhole | 53.83 | 44.84 | 51.79 | 66.60 | 53.21 | 54.05 | |
| MFFD | Normal | 74.19 | 45.96 | 64.98 | 73.38 | 74.16 | 66.53 | 160 |
| | Multi-pinhole | 61.68 | 43.82 | 61.13 | 68.96 | 62.78 | 59.67 | |

INFORMATION PROCESSING METHOD, INFORMATION PROCESSING SYSTEM, AND INFORMATION PROCESSING APPARATUS

CROSS REFERENCE TO RELATED APPLICATIONS

The present application is based on and claims priority of Japanese Patent Application No. 2020-109061 filed on Jun. 24, 2020 and U.S. Provisional Patent Application No. 62/943,494 filed on Dec. 4, 2019. The entire disclosures of the above-identified applications, including the specifications, drawings and claims are incorporated herein by reference in their entirety.

FIELD

One or more exemplary embodiments disclosed herein relate generally to an information processing method, an information processing system, and an information processing apparatus.

BACKGROUND

In recent years, object recognition is performed by machine learning-based image recognition using images. For example, PTL 1 discloses an image processing apparatus that performs image recognition by deep learning (deep structured learning).

NPL 1 discloses "CenterNET-Res18" and "CenterNET-DLA34" which are each a machine learning algorithm in image recognition. NPL 2 discloses "RefineDet" which is a machine learning algorithm in image recognition. NPL 3 discloses "YOLOv3-tiny" which is a machine learning algorithm in image recognition. NPL 4 discloses "MFFD" which is a machine learning algorithm in image recognition. "MFFD" is also referred to as "ThinNet".

CITATION LIST

Patent Literature

PTL 1: Japanese Unexamined Patent Application Publication No. 2018-163554

Non Patent Literature

NPL 1: X. Zhou, D. Wang, and P. Krahenbuhl, "Objects as points," arXiv preprint arXiv:1904.07850, 2019.
NPL 2: S. Zhang, L. Wen, X. Bian, Z. Lei, and S. Z. Li, "Single-shot refinement neural network for object detection," CVPR, 2018.
NPL 3: J. Redmon and A. Farhadi, "Yolov3: An incremental improvement," arXiv preprint arXiv:1804.02767, 2018.
NPL 4: S. Cao, Y. Liu, P. Lasang, and S. Shen, "Detecting the objects on the road using modular lightweight network," arXiv preprint arXiv:1811.06641, 2018.

SUMMARY

Technical Problem

However, the technique disclosed in PTL 1 does not take into account the protection of the privacy of objects in images. Techniques of processing images for privacy protection are known, but image recognition using processed images tends to produce poor recognition results.

One non-limiting and exemplary embodiment provides an information processing method, an information processing system, and an information processing apparatus that can prevent a decrease of recognition performance in image recognition of objects using images while protecting the privacy of the objects in the image recognition.

Solution to Problem

In one general aspect, the techniques disclosed here feature an information processing method executed by a computer, the information processing method including: obtaining a first image generated by a multi-pinhole camera; extracting at least one point spread function (PSF) in each of a plurality of regions in the first image; obtaining a second image different from the first image, and reference data used in machine learning for the second image; generating a third image, by convolving each of a plurality of regions in the second image with at least one PSF extracted in a corresponding region of the plurality of regions in the first image; and outputting a pair of the reference data and the third image.

In one general aspect, the techniques disclosed here feature an information processing system including: a first obtainer that obtains a first image generated by a multi-pinhole camera; a PSF extractor that extracts at least one point spread function (PSF) in each of a plurality of regions in the first image; a second obtainer that obtains a second image different from the first image, and reference data used in machine learning for the second image; an image generator that generates a third image, by convolving each of a plurality of regions in the second image with at least one PSF extracted in a corresponding region of the plurality of regions in the first image; and an outputter that outputs a pair of the reference data and the third image.

In one general aspect, the techniques disclosed here feature an information processing apparatus including: an obtainer that obtains a fourth image; a controller that inputs the fourth image to an inference model to obtain an inference result; and an outputter that outputs data based on the inference result obtained, wherein the inference model is trained using: reference data used in machine learning for a second image; and a third image as training data, the third image is generated by convolving each of a plurality of regions in the second image with at least one point spread function (PSF) extracted in a corresponding region of a plurality of regions in a first image that is different from the second image, and the first image is generated by a multi-pinhole camera.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The information processing method, etc. according to one or more exemplary embodiments or features disclosed herein can prevent a decrease of recognition performance in image recognition of objects using images while protecting the privacy of the objects in the image recognition.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a diagram illustrating recognition performance of each recognition model.

Figure 1:
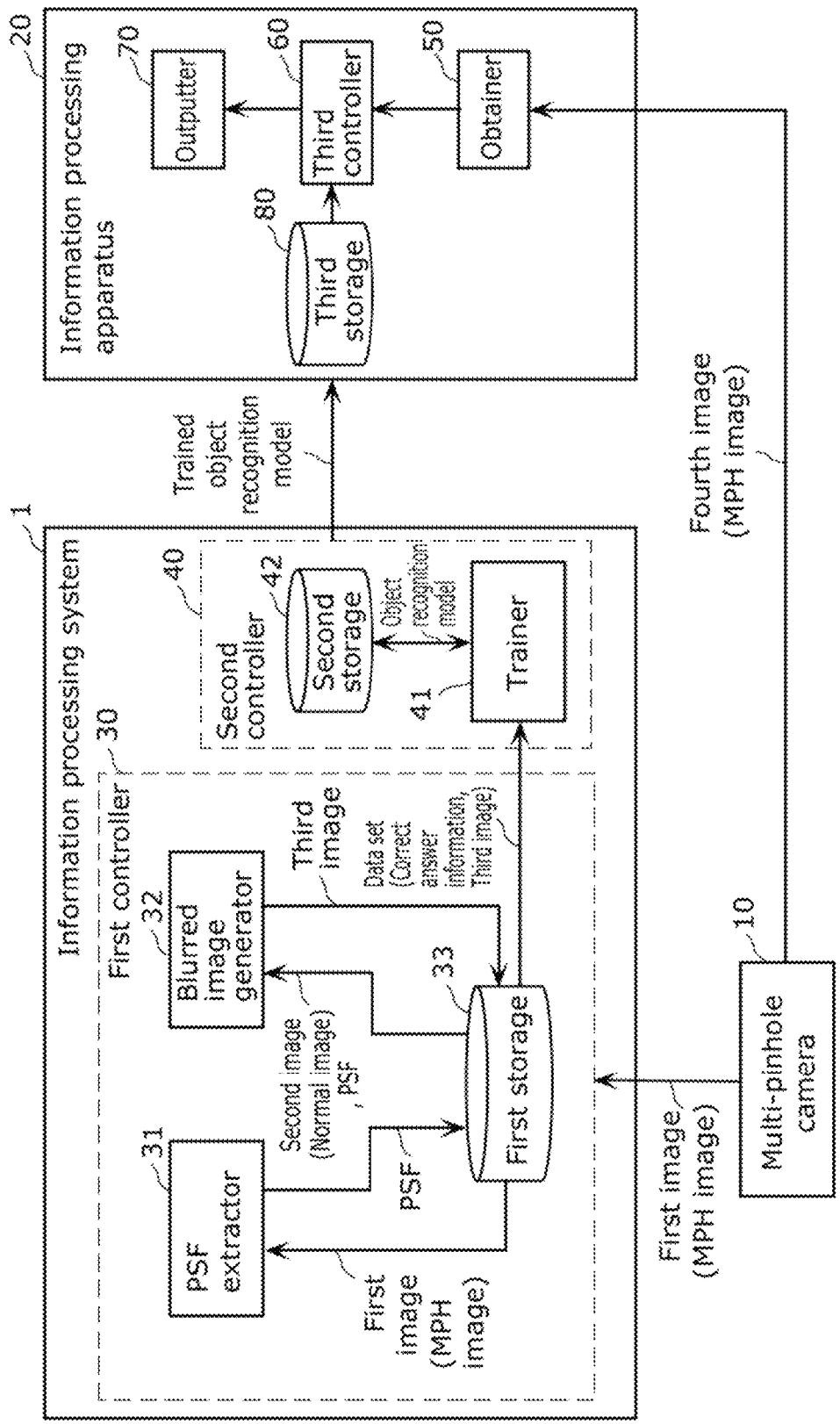
FIG. 1 is a block diagram illustrating a functional structure of an information processing system according to an embodiment.

DESCRIPTION OF EMBODIMENT (Underlying Knowledge Forming Basis of the Present Disclosure)

In relation to the techniques disclosed in the Background section, the inventors have found the following problems.

In recent years, cameras such as monitoring cameras are extensively installed indoors and outdoors and images involving privacy, such as the states of people indoors, the faces of pedestrians, and vehicle registration plates, are easily obtained. In view of this, the importance of privacy protection for objects shown in images captured by cameras is increasing. According to an exemplary embodiment disclosed herein, an image of an object is captured using a multi-pinhole camera in terms of protecting the privacy of the object. An image (multi-pinhole image: MPH image) captured by a multi-pinhole camera is an image including parallax property (described in detail later). In other words, the MPH image is a blurred image. Since the obtained image is a blurred image, the privacy of the object can be protected. The multi-pinhole camera is a camera having a multi-pinhole mask in which multiple pinholes are formed.

Such an MPH image is, for example, subjected to image recognition using an image recognition model generated by machine learning. The image recognition model is requested to perform accurate image recognition even in the case where an MPH image captured by a multi-pinhole camera, i.e. a blurred image, is input.

For example, the image recognition model is trained using a published data set of images. However, published data sets are mainly data sets for normal cameras (e.g. digital cameras). With use of such a data set, it is difficult to effectively train the image recognition model for recognizing MPH images which are images having blurs specific to multi-pinhole cameras. Although a data set for training the image recognition model can be generated using images captured by a multi-pinhole camera, it takes significant time and cost.

The inventors have conducted intensive studies to easily generate a data set for training an image recognition model for recognizing MPH images, and conceived an information processing method, etc. described below. An image recognition model trained using the below-described information processing method, etc. can prevent a decrease of recognition performance in image recognition of objects using images while protecting the privacy of the objects in the image recognition. Although the case where the image recognition model is an object recognition model will be described below, the image recognition model is not limited to such. The techniques disclosed here are applicable to image recognition models (e.g. scene recognition model, etc.) other than the object recognition model.

According to an exemplary embodiment disclosed herein, an information processing method is executed by a computer, and includes: obtaining a first image generated by a multi-pinhole camera; extracting at least one point spread function (PSF) in each of a plurality of regions in the first image; obtaining a second image different from the first image, and reference data used in machine learning for the second image; generating a third image, by convolving each of a plurality of regions in the second image with at least one PSF extracted in a corresponding region of the plurality of regions in the first image; and outputting a pair of the reference data and the third image.

An MPH image has a property of having a different PSF in each of a plurality of regions in the image. Hence, by convolving the second image with at least one PSF in each of the plurality of regions in the first image, the third image that is the same as or similar to an MPH image can be generated. That is, the pair of the reference data and the third image can be obtained without performing imaging for obtaining the third image by the multi-pinhole camera. Thus, a data set for machine learning, i.e. the pair of the reference data and the third image, can be easily generated.

An image (MPH image) generated by the multi-pinhole camera is a blurred image, with which the privacy of an object can be protected. Moreover, an inference model (image recognition model) trained using a data set for machine learning, i.e. the pair of the reference data and the third image, is capable of image recognition with an MPH image as input. In this way, it is possible to prevent a decrease of recognition performance in image recognition of objects using images while protecting the privacy of the objects.

For example, the at least one PSF extracted in each of the plurality of regions in the first image may comprise a plurality of PSFs, and a PSF with which each of the plurality of regions in the second image is convolved may be selected from the plurality of PSFs.

In this way, the PSF to be convolved is selected from the plurality of PSFs, with it being possible to generate the third image that further improves the training efficiency. Thus, a decrease of recognition accuracy in image recognition of objects using images can be further prevented.

For example, a plurality of the second images may be obtained, and the PSF selected to convolve each of the plurality of regions in the second image may be different between the plurality of the second images.

In this way, the third image that differs in PSFs, i.e. differs in the degree of blur, can be generated for each of the plurality of second images. Thus, a decrease of recognition accuracy in image recognition of objects using images can be further prevented.

For example, the information processing method may include: training an inference model by machine learning, using the third image as training data and the reference data.

In this way, a series of processes from the generation of the data set for training the inference model to the training of the inference model using the data set can be integrally performed. Thus, the inference model capable of protecting the privacy of objects can be easily generated while preventing a decrease of recognition accuracy in image recognition of objects using images.

For example, the plurality of regions in the first image and the plurality of regions in the second image may correspond one-to-one to each other.

In this way, the third image can be generated using the PSF corresponding to each region in the second image. Thus, the third image that enables more efficient training can be generated.

For example, the plurality of regions in the first image and the plurality of regions in the second image may each include a plurality of pixels.

In this way, the storage capacity required of the storage in order to store the PSFs extracted from the first image can be reduced, as compared with the case where each region is formed by one pixel (e.g. In the case where there is a PSF for each pixel).

For example, the second image may be an image generated by a camera different from the multi-pinhole camera by which the first image is generated.

In this way, the third image can be generated simply by performing convolution operation using the second image generated by the camera.

According to an exemplary embodiment disclosed herein, an information processing system includes: a first obtainer that obtains a first image generated by a multi-pinhole camera; a PSF extractor that extracts at least one point spread function (PSF) in each of a plurality of regions in the first image; a second obtainer that obtains a second image different from the first image, and reference data used in machine learning for the second image; an image generator that generates a third image, by convolving each of a plurality of regions in the second image with at least one PSF extracted in a corresponding region of the plurality of regions in the first image; and an outputter that outputs a pair of the reference data and the third image.

With this, the same advantageous effects as the information processing method can be achieved.

According to an exemplary embodiment disclosed herein, an information processing apparatus includes: an obtainer that obtains a fourth image; a controller that inputs the fourth image to an inference model to obtain an inference result; and an outputter that outputs data based on the inference result obtained, wherein the inference model is trained using: reference data used in machine learning for a second image; and a third image as training data, the third image is generated by convolving each of a plurality of regions in the second image with at least one point spread function (PSF) extracted in a corresponding region of a plurality of regions in a first image that is different from the second image, and the first image is generated by a multi-pinhole camera.

With this, the same advantageous effects as the information processing method can be achieved.

These general and specific aspects may be implemented using a system, an apparatus, a method, an integrated circuit, a computer program, or a non-transitory computer-readable recording medium such as CD-ROM, or any combination of systems, apparatuses, methods, integrated circuits, computer programs, and recording media.

Hereinafter, certain exemplary embodiments will be described in greater detail with reference to the accompanying drawings. Each of the exemplary embodiments described below shows a general or specific example. The numerical values, elements, steps, the processing order of the steps etc. shown in the following exemplary embodiments are mere examples, and therefore do not limit the scope of the appended claims and their equivalents. Therefore, among the elements in the following exemplary embodiments, those not recited in any one of the independent claims are described as optional elements.

Each drawing is a schematic and does not necessarily provide precise depiction. For example, scale and the like are not necessarily consistent throughout the drawings. The substantially same elements are given the same reference marks throughout the drawings, and repeated description is omitted or simplified.

In the specification, the terms indicating the relationships between elements, such as "equal", the terms indicating the shapes of elements, such as "rectangular", the numerical values, and the numerical ranges are not expressions of strict meanings only, but are expressions of meanings including substantially equivalent ranges, for example, a difference of about several percent.

Embodiment

An information processing system, etc. according to this embodiment will be described below, with reference to FIGS. 1 to 9.

[1. Structure of Information Processing System]

A structure of information processing system 1 according to this embodiment will be described below, with reference to FIG. 1. FIG. 1 is a diagram illustrating a functional structure of information processing system 1 according to this embodiment. Information processing system 1 is a system that generates, based on an MPH image captured by multi-pinhole camera 10, a data set for training an object recognition model which is an example of an image recognition model, and trains (learns) the object recognition model using the generated data set for training. The data set for training is also referred to as a data set for learning. The object recognition model is also an example of an inference model.

As illustrated in FIG. 1, information processing system 1 is communicably connected to multi-pinhole camera 10 and information processing apparatus 20.

Multi-pinhole camera 10 is capable of simultaneously obtaining, by one imaging operation, a plurality of images (pinhole images: PH images) that differ in the point of view on an object (subject) from each other. Multi-pinhole camera 10 is a camera using a plurality of pinholes (multiple pinholes), and includes a multi-pinhole mask and an image sensor. The multi-pinhole mask is located at a certain distance away from the image sensor, on the object side. That is, light rays that have passed through the multi-pinhole mask are incident on the image sensor. The multi-pinhole mask has a plurality of pinholes arranged randomly or at equal intervals. The plurality of pinholes are, for example, two or more pinholes.

The image sensor obtains an image (MPH image) of the object through the pinholes. The MPH image is an image obtained through the pinholes. Since a different PH image is obtained depending on the position and size of each pinhole, the image sensor obtains an image (coded image) resulting from superposing the plurality of PH images, as the MPH image.

The image sensor obtains the MPH image with which the point spread functions (PSFs) of multi-pinhole camera 10 can be obtained (described in detail later). The MPH image with which the PSFs can be obtained is also referred to as a first image. A PSF indicates how an image blurs (deteriorates) by an optical system when imaging a point light source, and is a function representing an intensity distribution in blurring. The PSF can be regarded as a function representing how light rays spread in the case where an ideal point light source passes through the optical system. The PSF is ideally an impulse response.

The position of each pinhole influences the position of the object projected on the image sensor, and the size of each pinhole influences the blur of the MPH image. Multi-pinhole camera 10 obtains the MPH image by superposing the plurality of PH images that differ in the position of the object, using the multi-pinhole mask. The plurality of PH images are images that differ slightly in the point of view from each other. That is, the MPH image is an image including parallax information.

The MPH image may be an image not visually recognizable by humans. However, information included in the MPH image, such as the object of imaging and its surrounding environment, can be obtained with use of computer processing.

In this specification, an image captured by a camera other than multi-pinhole camera 10 is also referred to as a normal image. The normal image is, for example, an image captured through an optical system. Typically, the normal image is obtained by forming an image of light from an object condensed by the optical system. An example of the optical system is a lens. When a human directly views an object in an environment in which the object is present, the human perceives the object substantially in the same state as the normal image. In other words, the human visually recognizes a normal image captured by a normal camera (e.g. digital camera) in the same state as in the real space. The normal camera does not have a multi-pinhole mask.

Information processing system 1 generates a data set for training based on the MPH image captured by multi-pinhole camera 10, and trains the object recognition model using the generated data set for training. Information processing system 1 includes first controller 30 and second controller 40. Information processing system 1 may include a communicator that communicates with an external apparatus. The communicator is, for example, implemented by a communication circuit. First controller 30 obtains the first image (MPH image) from multi-pinhole camera 10, and stores the first image in first storage 33.

First controller 30 generates the data set for training the object recognition model, based on the first image (MPH image) obtained from multi-pinhole camera 10. First controller 30 includes PSF extractor 31, blurred image generator 32, and first storage 33.

PSF extractor 31 extracts the PSFs of multi-pinhole camera 10 based on the MPH image. PSF extractor 31 divides the first image into a plurality of regions, and extracts at least one PSF in each of the plurality of regions. The plurality of regions are two or more regions. Each of the plurality of regions includes a plurality of pixels, although the disclosed techniques are not limited to such. For example, each of the plurality of regions may include only one pixel. That is, as many regions as pixels may be set.

Blurred image generator 32 generates, based on a second image (normal image) stored in first storage 33 and the PSFs extracted by PSF extractor 31, a third image obtained by blurring the second image. For example, blurred image generator 32 generates the third image by subjecting the second image to convolution operation (convolution-integration operation) using the PSFs. Blurred image generator 32 divides the second image into a plurality of regions, and subjects each region to convolution operation using a PSF corresponding to the region and extracted by PSF extractor 31. In other words, blurred image generator 32 generates the third image from the second image by convolving each of the plurality of regions in the second image with at least one PSF extracted in a corresponding region of the plurality of regions in the first image.

The third image generated in this way is an image similar to an image captured by multi-pinhole camera 10. That is, the third image is an image in which a plurality of PH images are superposed. The third image may be an image not visually recognizable by humans, but is an image that can be used as an image for training the object recognition model. The second image is different from the first image.

The plurality of regions in the second image are two or more regions. Each of the plurality of regions includes a plurality of pixels, although the disclosed techniques are not limited to such. For example, each of the plurality of regions may include only one pixel. That is, as many regions as pixels may be set.

The second image is, for example, an image generated by a camera different from multi-pinhole camera 10 that obtains the first image. In this embodiment, the second image is an image captured by a camera other than multi-pinhole camera 10. For example, the second image is an image captured by a normal camera (e.g. digital camera).

In the case where PSF extractor 31 extracts two or more PSFs in each of the plurality of regions, blurred image generator 32 may change a PSF used for the convolution operation in each of a plurality of second images. Blurred image generator 32 may, in each of the plurality of regions, select a PSF used for the convolution operation of the second image from the plurality of PSFs corresponding to the region. Blurred image generator 32 suffices to change, in each of the plurality of second images, a PSF in at least one of the plurality of regions in the second image. Blurred image generator 32 is an example of an image generator.

First storage 33 stores images and the like for generating the data set for training the object recognition model. For example, first storage 33 stores the first image (MPH image), the second image (normal image), correct answer information corresponding to the second image, the PSFs of multi-pinhole camera 10 (PSFs based on the first image), and the third image generated based on the second image. The second image and the correct answer information corresponding to the second image may be obtained by downloading a data set for training published on the Internet. The correct answer information includes information of a category to which an object included in the second image belongs, and information of the position of the object. Non-limiting examples of the category of the object include persons, furniture, vehicles, bicycles, and traffic lights. The position information includes the position of the object on the second image. First controller 30 stores the second image and the correct answer information in first storage 33 in association with each other. First storage 33 is, for example, implemented by semiconductor memory, without being limited thereto. The correct answer information stored in first storage 33 is annotation information, and may be obtained through the communicator (not illustrated).

As described above, first controller 30 functions as a data set generation apparatus that generates the data set used for training the object recognition model.

Second controller 40 trains the object recognition model using the data set for training generated by first controller 30. Second controller 40 includes trainer 41 and second storage 42. The object recognition model is an example of a machine learning model for obtaining information of an object based on an image. The object recognition model is, for example, a machine learning model using a neural network such as deep learning. The object recognition model may be any other machine learning model.

Trainer 41 trains the object recognition model for performing object detection on an MPH image captured by multi-pinhole camera 10. Trainer 41 trains the object recognition model using the data set (the third image, and correct answer information corresponding to the third image) obtained from first controller 30. In other words, trainer 41 causes the object recognition model to learn using the data set. The correct answer information is an example of reference data used in machine learning.

For example, the machine learning is realized by backpropagation in deep learning. Specifically, trainer 41 inputs the third image to the object recognition model, and obtains a detection result output from the object recognition model. Trainer 41 then adjusts the object recognition model so that the detection result will be the correct answer information. By repeatedly performing such adjustment using a plurality of third images different from each other and items of correct answer information corresponding to the plurality of third images (e.g. several thousand pairs of third images and items of correct answer information), trainer 41 improves the detection accuracy of the object recognition model.

Second storage 42 stores the object recognition model. The expression "storing the object recognition model" herein means storing information such as network parameters and an operation algorithm (machine learning algorithm) in the object recognition model. Non-limiting examples of the algorithm include ThinNet, YOLOv3-tiny, RefineDet (Single-Shot Refinement Neural Network for Object Detection), CenterNET-res18, and CenterNET-DLA34. Second storage 42 is, for example, implemented by semiconductor memory, without being limited thereto. Second storage 42 and first storage 33 may be implemented by different storage devices or by the same storage device.

As described above, second controller 40 functions as a training apparatus (learning apparatus) that trains the object recognition model using the data set generated by first controller 30. Second controller 40 transmits the trained object recognition model to, for example, information processing apparatus 20.

Information processing apparatus 20 performs object recognition using the trained object recognition model. Information processing apparatus 20 includes obtainer 50, third controller 60, outputter 70, and third storage 80.

Obtainer 50 obtains a fourth image (MPH image) from multi-pinhole camera 10. The fourth image is not an image for extracting PSFs, but is an image subjected to object recognition by the already trained object recognition model. For example, the fourth image may be an image captured by multi-pinhole camera 10 installed at a predetermined position. The fourth image is a blurred image, and is an image with which the privacy of each object is protected. Obtainer 50 may store the obtained fourth image in third storage 80.

Third controller 60 performs control to input the fourth image to the object recognition model and obtain the recognition result. Third controller 60 inputs the fourth image to the object recognition model trained by trainer 41, and obtains the output of the object recognition model as the recognition result. The object recognition model trained by trainer 41 has improved recognition performance for MPH images. By using such an object recognition model, third controller 60 can perform recognition on MPH images without a decrease of recognition performance as compared with recognition performance on normal images. Third controller 60 is an example of a controller. The recognition result is an example of an inference result.

Outputter 70 outputs information based on the obtained recognition result. As an example, outputter 70 may be a display device such as a liquid crystal display, and output the information by display. As another example, outputter 70 may be a communication circuit, and transmit the data to an external apparatus through communication.

Third storage 80 stores the object recognition model trained by trainer 41. The trained object recognition model is obtained from information processing system 1 through communication and stored in third storage 80.

As described above, information processing apparatus 20 functions as an object recognition apparatus that performs object recognition on the fourth image captured by multi-pinhole camera 10 using the trained object recognition model.

Information processing system 1 may not include second controller 40.

[2. Operations of Information Processing System]

Figure 2:
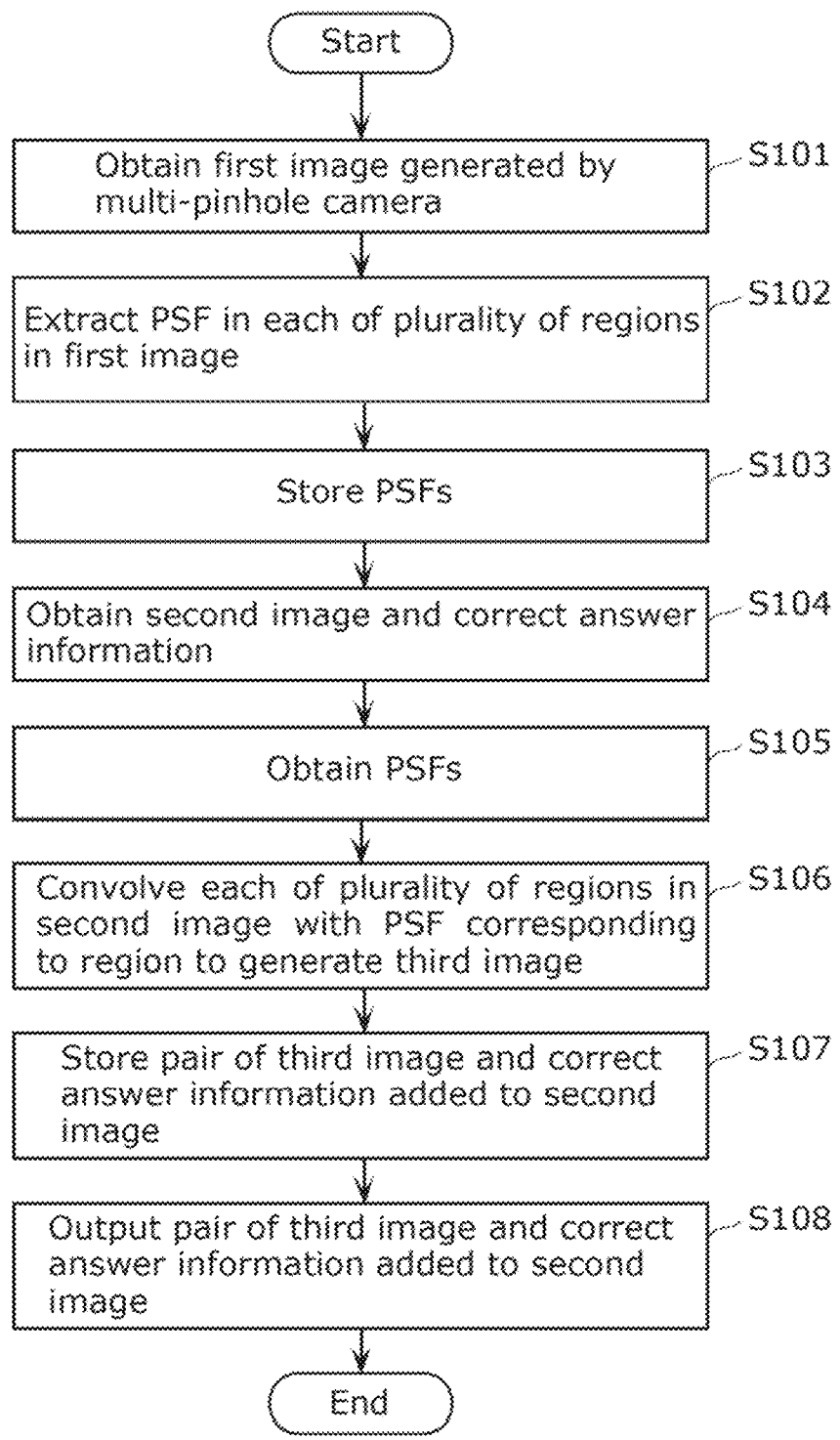
FIG. 2 is a flowchart illustrating an operation of generating a data set for training in the information processing system according to the embodiment.

Operations of information processing system 1 described above will be described below, with reference to FIGS. 2 to 9. First, an operation of generating a data set for training in information processing system 1 will be described below, with reference to FIGS. 2 to 6. FIG. 2 is a flowchart illustrating an operation of generating a data set for training in information processing system 1 according to this embodiment. Steps S101 to S103 in FIG. 2 correspond to an operation of obtaining PSFs from a first image in information processing system 1. Steps S104 to S108 in FIG. 2 correspond to an operation of generating a data set for training an object recognition model in information processing system 1.

As illustrated in FIG. 2, first controller 30 obtains a first image generated by multi-pinhole camera 10 (S101). First controller 30 obtains, from multi-pinhole camera 10, the first image captured by multi-pinhole camera 10. First controller 30, for example, stores the first image obtained from multi-pinhole camera 10 in first storage 33. First controller 30 functions as a first obtainer that obtains a first image.

Figure 3:
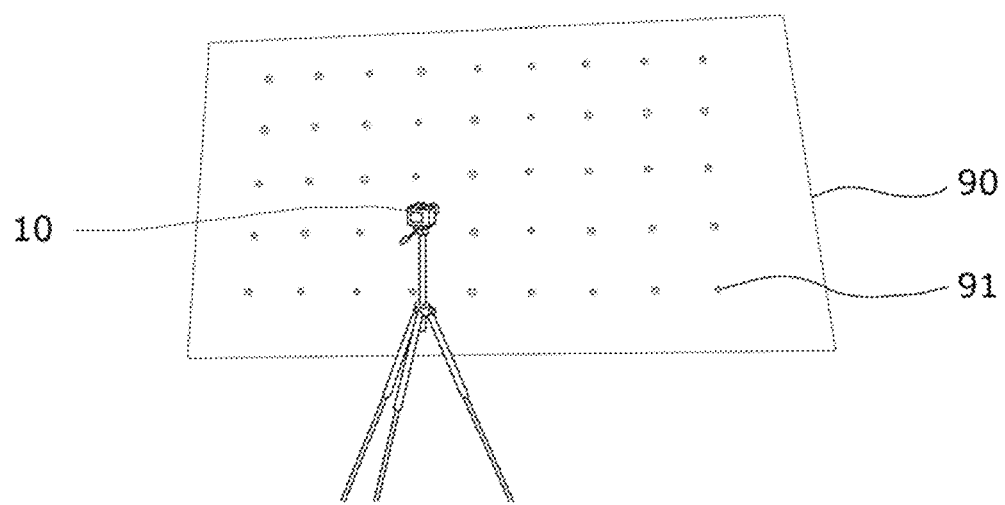
FIG. 3 is a diagram for explaining obtainment of a first image according to the embodiment.

The obtainment of the first image by multi-pinhole camera 10 will be described below, with reference to FIG. 3. FIG. 3 is a diagram for explaining the obtainment of the first image according to this embodiment.

As illustrated in FIG. 3, for example, a camera system including multi-pinhole camera 10 and screen 90 performs imaging to obtain the first image. Specifically, screen 90 displays one or more luminescent spots 91 (dot pattern). Multi-pinhole camera 10 is, for example, located so as to be capable of capturing an image of a region including each of the plurality of luminescent spots 91.

Multi-pinhole camera 10 performs imaging when screen 90 is in the dot pattern illustrated in FIG. 3, to obtain a first pattern image (pinhole image). Screen 90 then displays one or more luminescent spots 91 displaced slightly. Multi-pinhole camera 10 captures an image of the displaced dot pattern, to obtain a second pattern image (pinhole image). Multi-pinhole camera 10 captures an image of the dot pattern each time the position of the dot pattern is changed, thus obtaining a plurality of pattern images (a plurality of pinhole images).

The spacing between luminescent spots 91, the number of luminescent spots 91, and the shape of luminescent spots 91 (e.g. point-shaped or ring-shaped) are not limited to those illustrated in FIG. 3, as long as PSFs are obtainable.

Figure 4:
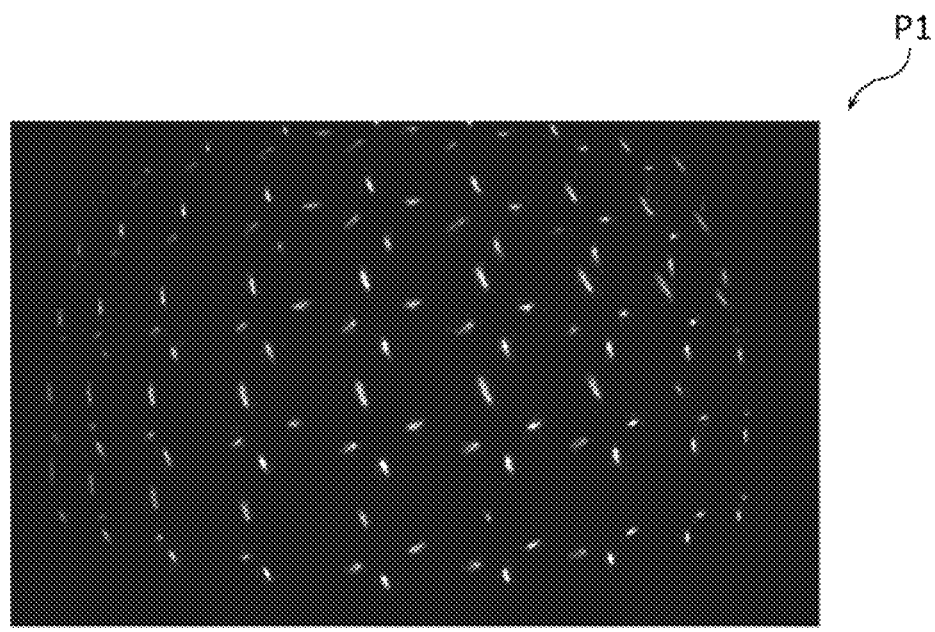
FIG. 4 is a diagram illustrating an example of the first image according to the embodiment.

Multi-pinhole camera 10 superposes the plurality of pattern images, to generate first image P1 illustrated in FIG. 4. FIG. 4 is a diagram illustrating an example of first image P1 according to this embodiment.

As illustrated in FIG. 4, first image P1 is an image having a plurality of streak-like bright parts. The extending direction of each part, the size of each part, and the number of parts are different depending on the location in first image P1. That is, an image captured by multi-pinhole camera 10 differs in PSF depending on the location in the image. Accordingly, in the below-described Step S102, PSF extractor 31 divides first image P1 into a plurality of regions, and extracts at least one PSF in each of the plurality of regions. First image P1 is, for example, an image unique to multi-pinhole camera 10.

Referring back to FIG. 2, PSF extractor 31 extracts at least one PSF in each of a plurality of regions in first image P1 (S102). Specifically, PSF extractor 31 reads first image P1 from first storage 33, divides read first image P1 into the plurality of regions, and extracts at least one PSF in each of the plurality of regions.

Figure 5:
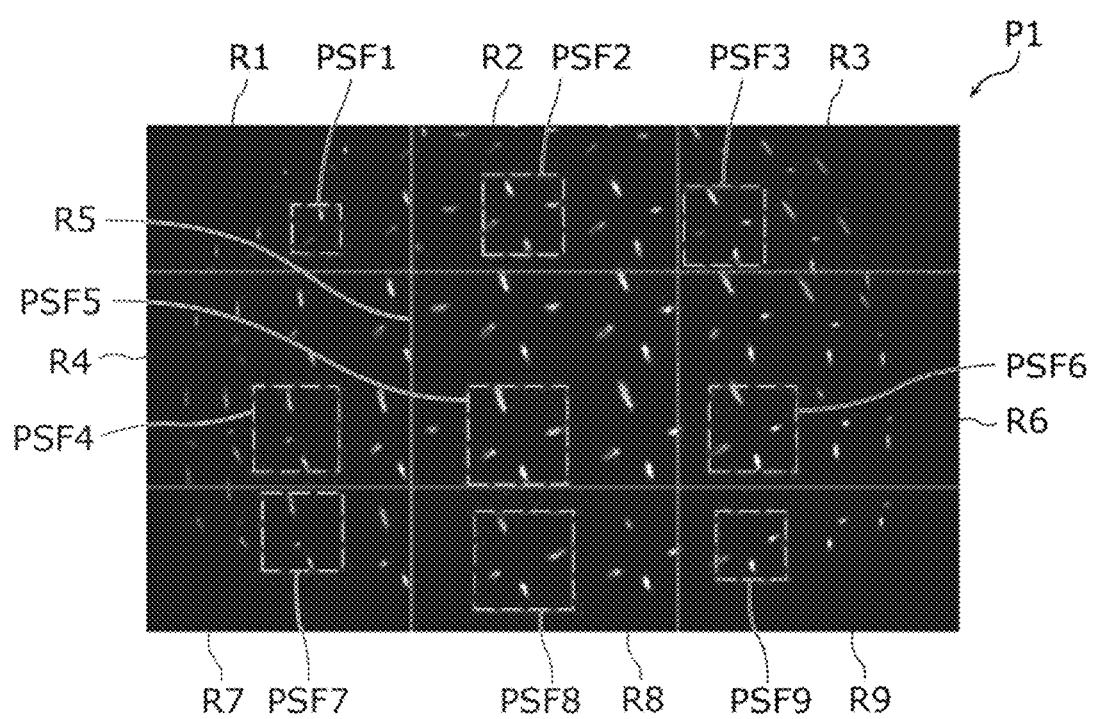
FIG. 5 is a diagram for explaining extraction of PSFs according to the embodiment.

The extraction of PSFs will be described below, with reference to FIG. 5. FIG. 5 is a diagram for explaining the extraction of PSFs according to this embodiment.

As illustrated in FIG. 5, for example, PSF extractor 31 divides first image P1 into nine regions R1 to R9. PSF extractor 31 then extracts one or more PSFs in each of regions R1 to R9. In the example in FIG. 5, PSF extractor 31 extracts one PSF in each of regions R1 to R9 (specifically, PSF extractor 31 extracts PSF1 to PSF9). PSF1 is a PSF corresponding to region R1, and is a function indicating the distribution of brightness in the dashed-line box. PSF1 indicates the degree of blur (deterioration state). In the example in FIG. 5, PSF1 is a PSF indicating blurring of incident light of the point light source so that a vertically extending bright part and a left-downward bright part will appear. For example, PSF1 is expressed as a three-dimensional function indicating position information and luminance information.

The PSF may be expressed as a function of light receiving intensity information for each wavelength, instead of luminance information. A lens and an image sensor are wavelength-dependent. Hence, for example in the case where color information of red, green, and blue is obtained, the PSF may be expressed as a five-dimensional function indicating position information and light receiving intensity information indicating red light receiving intensity, green light receiving intensity, and blue light receiving intensity. In such a case, a color image sensor (RGB sensor) is used in imaging, and PSF extractor 31 obtains a PSF for each of red, green, and blue. In the case where not a color image sensor but an image sensor for capturing a multispectral image is used, PSF extractor 31 may obtain a PSF for each wavelength.

The position of the dashed-line box in region R1, i.e. which part of the distribution of brightness in region R1 is extracted as a PSF, is not limited, and may be set freely.

Regarding each of PSF2 to PSF9, at least one PSF is extracted in the corresponding region in the same way as PSF1.

For example, information about the conditions in which first image P1 is divided into the plurality of regions (e.g. the number of regions, the sizes of the regions, etc.) may be stored in first storage 33 beforehand. PSF extractor 31 may, for example, divide first image P1 into the plurality of regions based on the information. For example, the number of regions may be determined as appropriate depending on the storage capacity of first storage 33 for storing PSFs, the processing capacity of blurred image generator 32, etc. The size and shape of each region generated as a result of division by PSF extractor 31 are not limited to the example in FIG. 5. For example, all regions may be equal in size, instead of regions R4 to R6 around the center of first image P1 being larger than the other regions. The shape of each region is not limited to a rectangle as illustrated in FIG. 5, and may be, for example, a square or a polygon other than a quadrilateral.

In the case where PSF extractor 31 extracts a plurality of PSFs from one region, PSF extractor 31 changes the position of the dashed-line box in the region. That is, PSF extractor 31 extracts a plurality of PSFs from one region simply by changing the position of the dashed-line box. The size of the dashed-line box in each region is determined depending on the position of the region in first image P1. For example, the size of the dashed-line box may be set to be larger when the region is closer to the center of first image P1.

Referring back to FIG. 2, PSF extractor 31 stores the PSFs extracted in Step S102, in first storage 33 (S103). The PSFs are PSFs corresponding to multi-pinhole camera 10. PSF extractor 31 stores the PSFs in first storage 33 in association with the regions in first image P1. PSF extractor 31 may output the PSFs extracted in Step S102 to blurred image generator 32.

Next, first controller 30 obtains a second image and correct answer information for generating a data set (S104). The number of pairs of second images and items of correct answer information obtained by first controller 30 is not limited as long as it is not less than 1. In this embodiment, first controller 30 obtains a plurality of pairs of second images and items of correct answer information. First controller 30 may obtain, for example, a published data set for machine learning through the communicator. The timing of Step S104 is not limited as long as it is before Step S106. For example, Step S104 may be performed before Step S101. Blurred image generator 32 obtains each second image by reading the second image from first storage 33. First controller 30 functions as a second obtainer that obtains a second image different from the first image and reference data used in machine learning for the second image.

Next, blurred image generator 32 obtains PSFs from first storage 33 (S105). Blurred image generator 32 reads, from first storage 33, the PSFs stored in Step S103, to obtain the PSFs. Blurred image generator 32 obtains, for each region generated as a result of dividing the second image, a PSF corresponding to the region.

Next, blurred image generator 32 convolves each of the plurality of regions in the second image with the PSF corresponding to the region, to generate a third image (S106). For example, blurred image generator 32 divides the second image into a plurality of regions so that the regions in first image P1 and the regions in the second image will correspond one-to-one to each other. Blurred image generator 32 may, for example, divide the second image into the same number of regions as the regions in first image P1.

Blurred image generator 32 may, for example, divide the second image into regions that correspond in position to the regions in first image P1. In this embodiment, first image P1 is divided into nine regions. Accordingly, blurred image generator 32 may, for example, divide the second image into nine regions whose positions in the image are the same as or similar to the positions of nine regions R1 to R9 in first image P1. The method by which blurred image generator 32 divides the second image into the plurality of regions is not limited to the above, as long as the second image is divided into two or more regions.

Figure 6:
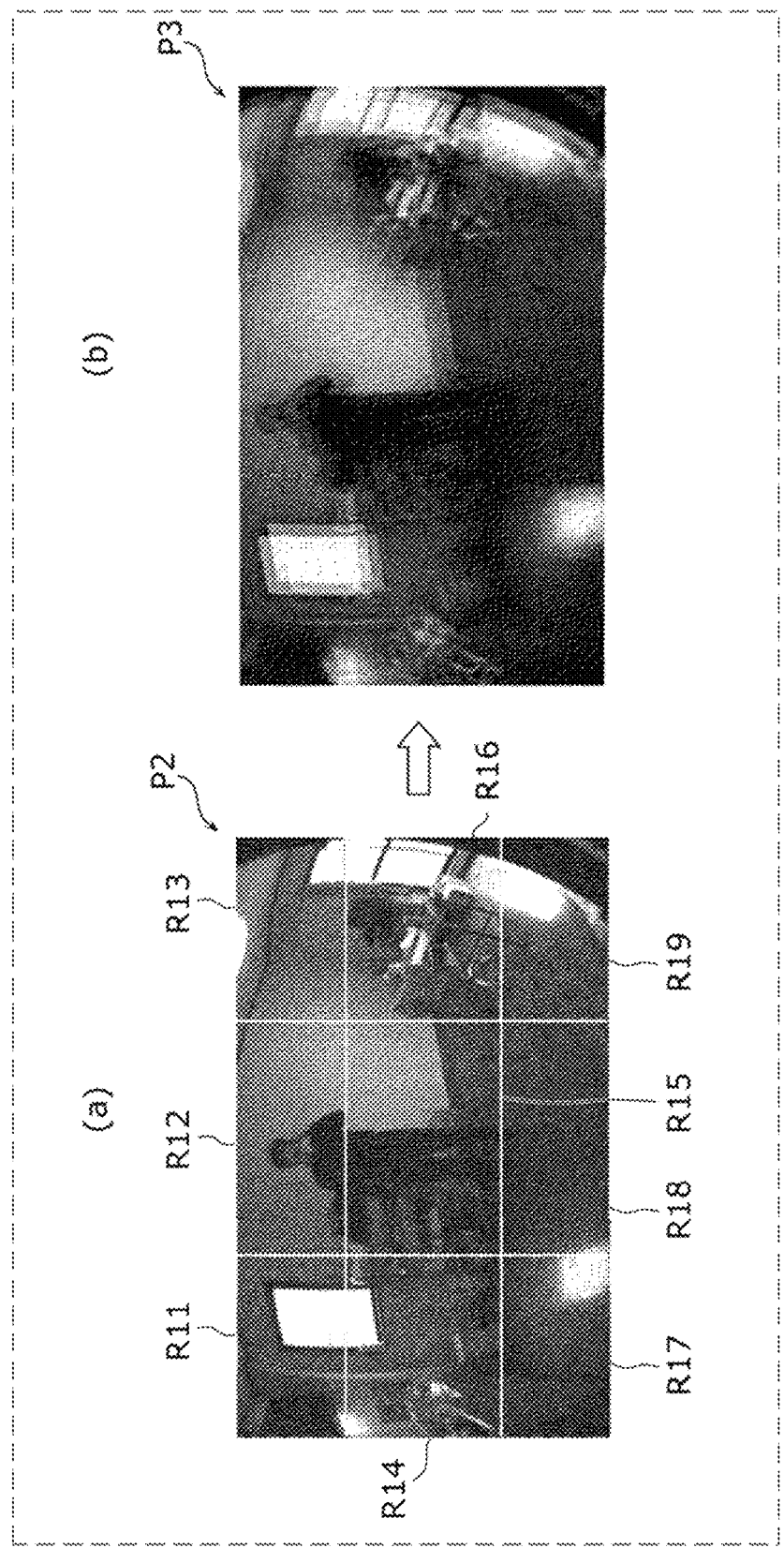
FIG. 6 is a diagram for explaining generation of a third image from a second image according to the embodiment.

The generation of the third image from the second image will be described below, with reference to FIG. 6. FIG. 6 is a diagram for explaining the generation of third image P3 from second image P2 according to this embodiment.

(a) in FIG. 6 illustrates second image P2 divided into nine regions (regions R11 to R19). Regions R11 to R19 in second image P2 respectively correspond to regions R1 to R9 in first image P1. For example, the size and position of region R11 in second image P2 are the same as or similar to the size and position of region R1 in first image P1. For example, blurred image generator 32 may read information about the image division conditions (e.g. the number of regions, the sizes of the regions, etc.) from first storage 33, and divide second image P2 into a plurality of regions based on the information.

(b) in FIG. 6 illustrates third image P3 generated by convolving second image P2 with PSFs. Blurred image generator 32 convolves each region in second image P2 with a PSF corresponding to the region, to generate third image P3. For example, blurred image generator 32 convolves region R11 in second image P2 with PSF1 which is the PSF of region R1 in first image P1 corresponding to region R11. Blurred image generator 32 convolves regions R12 to R19 in second image P2 respectively with PSF2 to PSF9. Thus, third image P3 which is a blurred image is generated as illustrated in (b) in FIG. 6. Third image P3 is like an image obtained by synthesizing a plurality of images that slightly differ in the point of view from each other. That is, third image P3 is like an image captured by multi-pinhole camera 10.

In the case where there are a plurality of second images P2 and a plurality of PSFs are extracted in each region in Step S102, blurred image generator 32 may select, as a PSF with which each region in second image P2 is to be convolved, a PSF different between the plurality of second images P2. Blurred image generator 32 may perform a convolution process on one second image P2 a plurality of times while varying a PSF with which each region in second image P2 is to be convolved. That is, blurred image generator 32 may generate, from one second image P2, a plurality of third images P3 that differ in the degree of blur.

Referring back to FIG. 2, blurred image generator 32 stores a pair of third image P3 generated in Step S106 and the correct answer information added to second image P2 from which third image P3 is generated, in first storage 33 (S107). Blurred image generator 32 stores third image P3 and the correct answer information in first storage 33 in association with each other.

As described above, first controller 30 generates, from second image P2 which is a normal image, third image P3 which is a blurred image by using the PSF of each region based on first image P1. In other words, first controller 30 generates, from second image P2 which is a normal image, an image as if captured by multi-pinhole camera 10. Information processing system 1 uses third image P3 as training data for the object recognition model. Thus, information processing system 1 can obtain the training data without capturing an image for training data using multi-pinhole camera 10. For example, first controller 30 can easily generate a data set for training the object recognition model, simply by obtaining an image (second image P2) included in a published data set and a PSF of each region based on first image P1.

Next, first controller 30 outputs the pair of third image P3 and the correct answer information added to second image P2, to second controller 40 (S108). First controller 30 reads the pair of third image P3 and the correct answer information from first storage 33, and outputs the read pair of third image P3 and the correct answer information to second controller 40. For example, when the number of pairs of third images P3 and items of correct answer information reaches at least a predetermined number, first controller 30 may output a data set including at least the predetermined number of pairs of third images P3 and items of correct answer information to second controller 40. First controller 30 functions as an outputter that outputs a pair of third image P3 and correct answer information.

Figure 7:
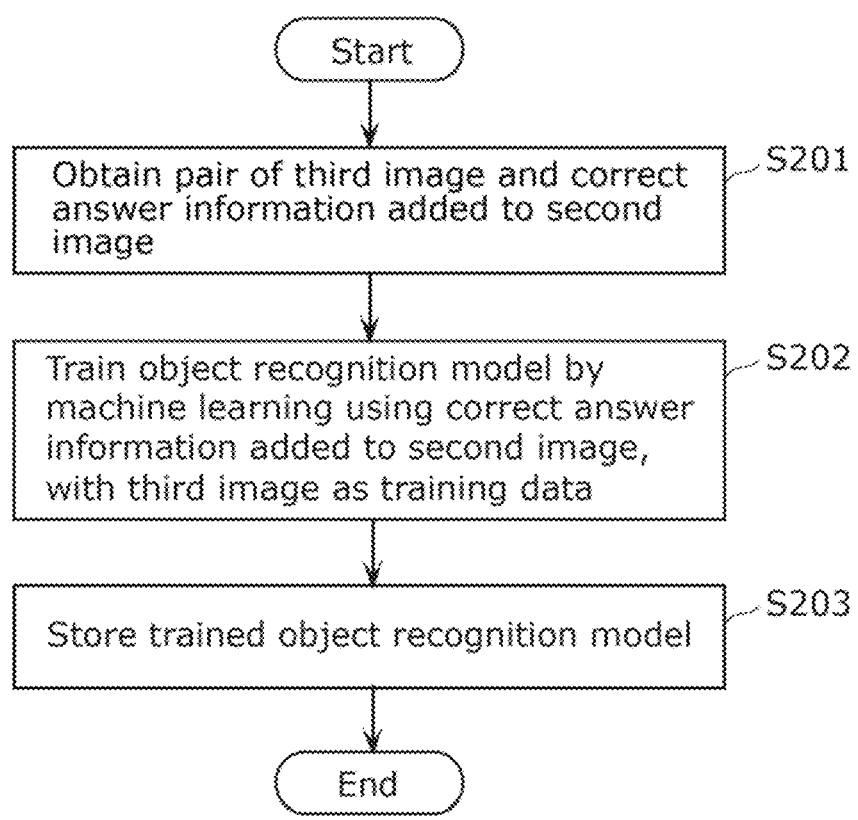
FIG. 7 is a flowchart illustrating an operation in training of an object recognition model according to the embodiment.

An operation of training an object recognition model using a data set for training in information processing system 1 will be described below, with reference to FIGS. 7 to 9. FIG. 7 is a flowchart illustrating an operation in training (learning) of the object recognition model according to this embodiment.

As illustrated in FIG. 7, trainer 41 obtains each pair of third image P3 and correct answer information added to second image P2 (S201). For example, trainer 41 obtains third image P3 and the correct answer information output from first controller 30. In other words, trainer 41 reads third image P3 and the correct answer information from first storage 33.

Next, trainer 41 trains the object recognition model by machine learning using the correct answer information added to second image P2, with third image P3 as training data (input data) (S202). Trainer 41 stores the trained object recognition model in second storage 42 (S203). For example, the machine learning is realized by backpropagation in deep learning, without being limited thereto.

The object recognition model capable of object detection on an MPH image (blurred image) captured by multi-pinhole camera 10 is thus generated.

The recognition performance of human activity recognition in a human activity recognition model as an example of the object recognition model trained as a result of the operation illustrated in FIG. 7 will be described below, with reference to FIGS. 8 and 9. FIG. 8 is a diagram illustrating the recognition performance of each machine learning algorithm of the human activity recognition model.

Five types of activities, namely, "eating", "lying", "sitting", "standing", and "vacuuming", in an image captured by a camera installed indoors are subjected to human activity identification. FIG. 8 illustrates the results of identifying the five types of activities by the human activity recognition model. "CenterNET-Res18", "CenterNET-DLA34", "RefineDet", "YOLOv3-tiny", and "MFFD" are used as machine learning algorithms (Method) of the human activity recognition model. Numerical values corresponding to the fields of normal camera (Normal) and multi-pinhole camera 10 (Multi-pinhole) indicate AP (Average Precision) and mAP which are each a recognition result precision rate. The precision rate for normal camera images is a precision rate when inputting normal images to the human activity recognition model according to each algorithm. The human activity recognition model may be a published model that has already been trained. The precision rate for images of multi-pinhole camera 10 is a precision rate when inputting multi-pinhole images to the human activity recognition model according to each algorithm and trained by trainer 41. For reference, the recognition speed of each machine learning algorithm is also listed as FPS (Frames Per Second).

As illustrated in FIG. 8, the difference between the precision rate for multi-pinhole images and the precision rate for normal images is reduced to 5% to 11%. An object recognition model with this level of performance serves its use. In the case where blurred images of multi-pinhole camera 10 are input to a published model that has already been trained, it is often impossible to recognize activities. In other words, the precision rate hardly reaches an expected value (or acceptable value). In view of this, training the human activity recognition model using the data set generated by first controller 30 contributes to significantly improved recognition performance for MPH images.

In the case where third image P3 included in the data set is generated based on second image P2 and one PSF, the precision rate of the object recognition model trained using the data set is likely to be lower than that in FIG. 8. This is considered to be due to the foregoing property of MPH images. To generate an object recognition model of high performance, third image P3 included in the data set may be generated based on second image P2 and a PSF corresponding to each of a plurality of regions generated by dividing second image P2. For example, at least one PSF may be extracted in each region in first image P1.

Figure 9:
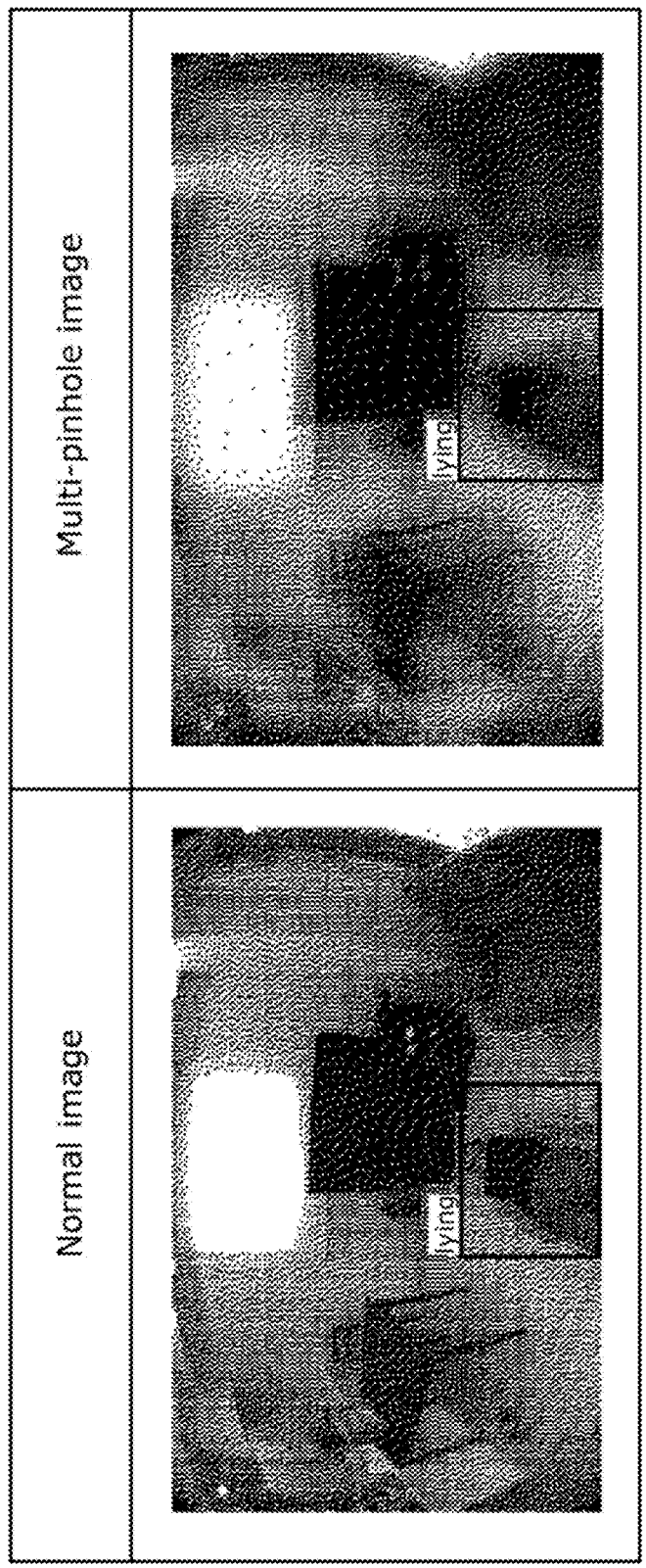
FIG. 9 is a diagram illustrating recognition results in the case where a machine learning algorithm of a human activity recognition model is RefineDet.

FIG. 9 is a diagram illustrating recognition results in the case where the machine learning algorithm of the human activity recognition model is RefineDet. Specifically, FIG. 9 illustrates recognition results for a normal image and a multi-pinhole image. In FIG. 9, an activity to be recognized is "lying". Each box (bounding box) indicates a candidate for "lying" in the recognition results.

This demonstrates that data sets generated by first controller 30 enable human activity identification models by various algorithms to achieve desired recognition performance. That is, first controller 30 can generate images (third images) effective for machine learning for training a model to be capable of recognizing MPH images. When an image actually captured by multi-pinhole camera 10 is input to an object recognition model trained using such a data set, object recognition can be performed with desired recognition performance.

Other Embodiments

While the presently disclosed techniques have been described above by way of the foregoing embodiment, the present disclosure is not limited to the foregoing embodiment. Other modifications obtained by applying various changes conceivable by a person skilled in the art to the foregoing embodiment and any combinations of the elements in different embodiments without departing from the scope of the present disclosure are also included in the scope of one or more aspects of the present disclosure.

For example, although the foregoing embodiment describes an example in which the second image is an image captured by a camera other than a multi-pinhole camera, the present disclosure is not limited to such. The second image may be an image captured by a multi-pinhole camera (e.g. a multi-pinhole camera with a different degree of blur) other than multi-pinhole camera 10 illustrated in FIG. 1. Since the image is a blurred image in this case, the image is processed to remove blur, thus obtaining the second image.

Although the foregoing embodiment describes an example in which the second image is obtained by a camera, the present disclosure is not limited to such. The second image may be generated by computer graphics (CG). The second image may be an image obtained by capturing a painting or the like, or may be an animated image (e.g. CG animation).

Although the foregoing embodiment describes an example in which the first controller generates the data set for training the object recognition model based on the PSFs obtained from the first image, the first controller may further generate, based on the PSFs, a data set for determining, for example, the recognition performance of the trained object recognition model.

Although the foregoing embodiment describes an example in which the machine learning model is a machine learning model using a neural network, any other machine learning model may be used. For example, the machine learning model may be a machine learning model using random forests, genetic programming, or the like.

Although the foregoing embodiment describes an example in which the recognition process using the trained object recognition model is performed in the information processing apparatus, the recognition process may be performed in the information processing system. Moreover, the information processing apparatus may be included in the multi-pinhole camera.

The orders of a plurality of processes described in the foregoing embodiment and the like are merely examples. A plurality of processes may be changed in order, and a plurality of processes may be performed in parallel. Part of a plurality of processing may be omitted.

The elements described in the foregoing embodiment and the like may be realized by software, and may be typically realized by LSI which is an integrated circuit. The elements may each be individually implemented as one chip, or may be partly or wholly implemented on one chip. While description has been made regarding LSI, there are different names such as IC, system LSI, super LSI, and ultra LSI, depending on the degree of integration. The circuit integration technique is not limited to LSIs, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the elements.

The division of the functional blocks in each block diagram is an example, and a plurality of functional blocks may be realized as one functional block, one functional block may be divided into a plurality of functional blocks, or part of functions may be transferred to another functional block. Moreover, functions of a plurality of functional blocks having similar functions may be realized by single hardware or software in parallel or in a time-sharing manner.

The information processing apparatus may be realized as a single apparatus or a plurality of apparatuses. For example, the first controller, the second controller, the obtainer, the third controller, and the outputter may be apparatuses different from each other in the case where the information processing apparatus is realized by a plurality of apparatuses, the elements in the information processing apparatus may be allocated to the plurality of apparatuses in any way. The method of communication between the plurality of apparatuses is not limited.

The presently disclosed techniques may be the foregoing program, or a non-transitory computer-readable recording medium having the program recorded thereon. The program can be distributed through a transmission medium such as the Internet. For example, the program or a digital signal including the program may be transmitted over an electric communication line, a wireless or wired communication line, a network such as the Internet, data broadcasting, or the like. The program or the digital signal including the program may be executed by another independent computer system, as a result of the program or the digital signal being recorded in a recording medium and being transported or as a result of the program or the digital signal being transferred over a network or the like.

Each of the elements in each of the above-described embodiments may be configured in the form of an exclusive hardware product, or may be realized by executing a software program suitable for the element. Each of the elements may be realized by means of a program executing unit, such as a CPU or a processor, reading and executing the software program recorded on a recording medium such as a hard disk or a semiconductor memory.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The information processing method, etc. according to one or more exemplary embodiments disclosed herein are widely applicable to apparatuses for performing image recognition using images.

The invention claimed is:

1. An information processing method executed by a computer, the information processing method comprising:
obtaining a first image generated by a multi-pinhole camera;
extracting at least one point spread function (PSF) in each of a plurality of regions in the first image;
obtaining a second image different from the first image, and reference data used in machine learning for the second image;
generating a third image, by convolving each of a plurality of regions in the second image with at least one PSF extracted in a corresponding region of the plurality of regions in the first image; and
outputting a pair of the reference data and the third image.

2. The information processing method according to claim 1,
wherein the at least one PSF extracted in each of the plurality of regions in the first image comprises a plurality of PSFs, and
a PSF with which each of the plurality of regions in the second image is convolved is selected from the plurality of PSFs.

3. The information processing method according to claim 2,
wherein a plurality of the second images are obtained, and the PSF selected to convolve each of the plurality of regions in the second image is different between the plurality of the second images.

4. The information processing method according to claim 1, comprising:
training an inference model by machine learning, using the third image as training data and the reference data.

5. The information processing method according to claim 1,
wherein the plurality of regions in the first image and the plurality of regions in the second image correspond one-to-one to each other.

6. The information processing method according to claim 1,
wherein the plurality of regions in the first image and the plurality of regions in the second image each include a plurality of pixels.

7. The information processing method according to claim 1,
wherein the second image is an image generated by a camera different from the multi-pinhole camera by which the first image is generated.

8. An information processing system, comprising:
a first obtainer that obtains a first image generated by a multi-pinhole camera;
a PSF extractor that extracts at least one point spread function (PSF) in each of a plurality of regions in the first image;
a second obtainer that obtains a second image different from the first image, and reference data used in machine learning for the second image;
an image generator that generates a third image, by convolving each of a plurality of regions in the second image with at least one PSF extracted in a corresponding region of the plurality of regions in the first image; and
an outputter that outputs a pair of the reference data and the third image.

9. An information processing apparatus, comprising:
an obtainer that obtains a fourth image;
a controller that inputs the fourth image to an inference model to obtain an inference result; and
an outputter that outputs data based on the inference result obtained,
wherein the inference model is trained using: reference data used in machine learning for a second image; and a third image as training data,
the third image is generated by convolving each of a plurality of regions in the second image with at least one point spread function (PSF) extracted in a corresponding region of a plurality of regions in a first image that is different from the second image, and
the first image is generated by a multi-pinhole camera.

* * * * *